Jan. 9, 1962 W. A. JACOBSON 3,016,229
PORTABLE ELECTRIC LIVESTOCK BARRIER AND GATE
Filed Nov. 17, 1958 2 Sheets-Sheet 1

INVENTOR
WALTER A. JACOBSON

Jan. 9, 1962 W. A. JACOBSON 3,016,229
PORTABLE ELECTRIC LIVESTOCK BARRIER AND GATE
Filed Nov. 17, 1958 2 Sheets-Sheet 2

INVENTOR
WALTER A. JACOBSON

United States Patent Office 3,016,229
Patented Jan. 9, 1962

3,016,229
PORTABLE ELECTRIC LIVESTOCK BARRIER
AND GATE
Walter A. Jacobson, 527 Wingra St., Madison 5, Wis.
Filed Nov. 17, 1958, Ser. No. 774,273
12 Claims. (Cl. 256—10)

This invention relates to a novel and useful method of controlling the movement of livestock and other animals. It consists of an uninsulated electric current or charge carrying wire. Extendible and retractable by virtue of its storage on a spring tensioned reel. The reel is contained within a housing to protect it against weather, debris, and general injury. The reel is also insulated against grounding the electric current or charge carried by wire. This current can be transferred to uninsulated wire by various means, for example, by contact with a stationary or a rotating axle, insulated from the housing, or contact with the wire stored upon the reel, or contact with the wire as it leaves housing.

This housing and assembly described in the preceding text is supported by a bracket which allows the mechanism to swing through a wide arc. This bracket is also the fastening attachment for the whole electric gate mechanism, and by its unique design it allows this electric gate mechanism to be attached to a great variety of objects within the environs it is intended to be used.

An insulated handle equipped with a hook also insulated from contact with current carrying wire, allows operator to extend and hook wire to an opposite support without wire's charge being grounded. But cattle coming in contact with uninsulated wire, carrying suitable current or electric charge for its purposes, ground it and so receive a shock which deters them from proceeding further.

The usefulness of this invention lies in the fact that it is a small compact mechanism easily moved from place to place and yet when the wire is extended forming an effective gate, or fence, when used with other similar "electric livestock gate" mechanism to form an enclosure. By its ready portability, this mechanism can take the place of many more permanent old style swinging gates.

It is a natural accessory to existing electric fence equipment and will complete the effective use of electric fencing equipment as both fencing and gate, and in use in conjunction with non-electric confining structures such as fences and walls, it will provide an effective gate or confining partition between these sections or parts thereof.

Its further excellence and novelty is that when in use or disuse it will not close off other areas and openings not intended to be blocked, nor will it occupy useable space as existing hinged type gates are apt to do. In short, it restricts movement only where it is desired to be restricted.

Other objects, advantages and features of invention may appear from the accompanying drawings, and subjoined detailed description and appended claims.

FIGURE 1 shows a part cut-away or part section view of the assembled "electric livestock gate." The support attachment and outer housing of assembly are cut away on the mid-line of the medial axis. The reel support and reel and handle are shown in side view or elevation. There is a cut-away section in nearest lateral surface of reel support and in insulated wire to power supply to show positioning tabs, and another cut-away portion in metal strip keyed into notch on axle to show notch.

Figure 1:
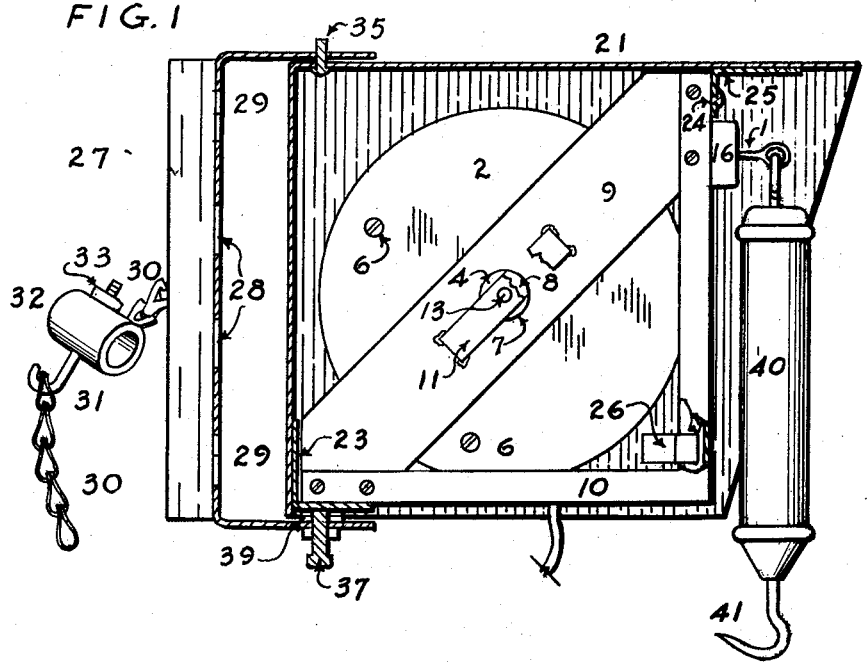
Figure 2:
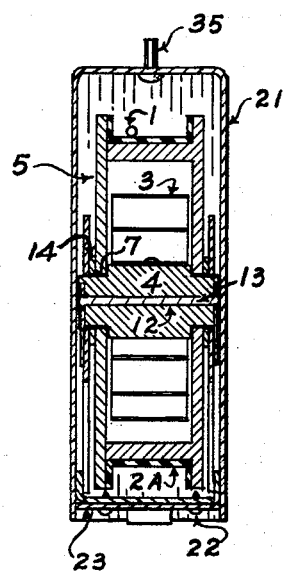
FIGURE 2 shows assembly minus support attachment in vertical transverse section cut through center of reel.
Figure 3:
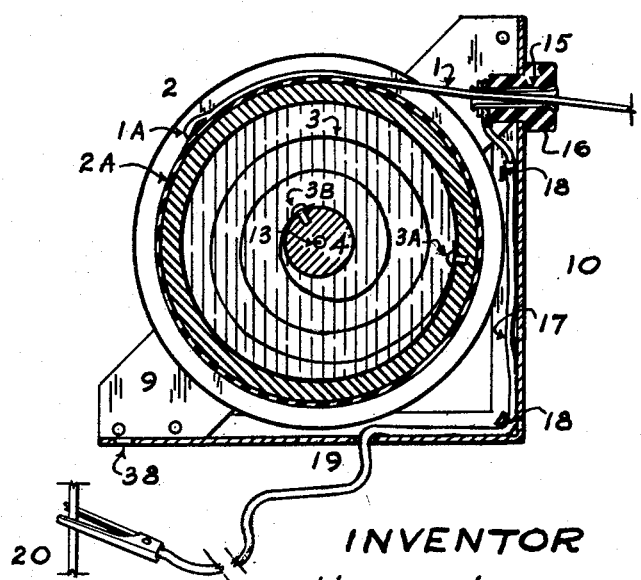
FIGURE 3 shows reel carriage only in a section cut on the medial plane of reel carriage.
Figure 4:
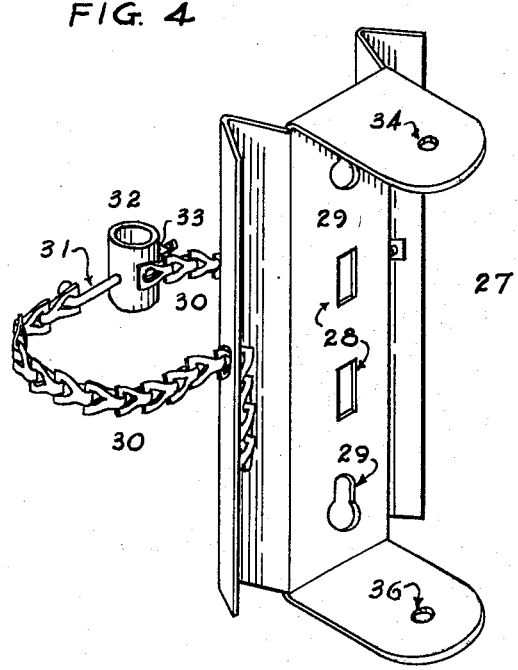
FIGURE 4 shows the support attachment in perspective.
Figure 5:
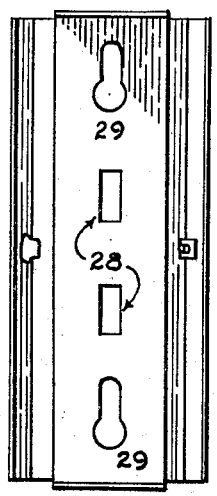
FIGURE 5 shows support attachment in front view. Fastening chains are not shown.
Figure 6:
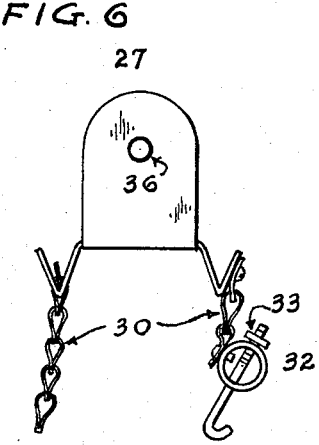
FIGURE 6 shows top view of support attachment with chains secured.

Referring to FIGURES 1, 2, and 3 which show an insulated electrical conducting wire 1 fastened on one end 1A to, and stored upon, a reel 2 with an insulated drum surface 2A. The reel is tensioned by a spring 3 which one end of 3A is fastened to the inside of reel 2 and the other end 3B to the stationary axle 4 upon which the reel 2 rotates. One lateral surface of the reel 2 acts as a lid 5 and is secured to the remaining portion of reel 2 by small bolts in threaded holes 6. This allows the installation of the spring 3 inside of reel 2. Through the center point of the two lateral surfaces of the reel 2 (one being the lid 5) there are holes 7, see FIGURE 2. These holes 7 allow the axle 4 passage to the exterior of lid 5, and holes 7 also act as bearings for reel 2's rotation.

The ends of axle 4 have notches 8 (FIGURE 1). These ends of axle 4 emerge through the diagonal support members 9 of reel carriage 10 and are secured from rotating by metal strips 11 welded to diagonal members 9 of reel carriage 10 so that they engage notches 8 and so keep axle 4 from rotating. There is a hole 12 through axle 4 and corresponding and aligned holes in metal strips 11 through which a pin 13 is inserted and riveted into position. This positions all parts (axle 4, diagonals 9, and reel 2). The distance between notches 8 on axle 4 determines the sideway freedom of reel 2. Enough clearance is allowed to insert washers 14 on each side of reel 2 to prevent contact of reel 2 with reel carriage 10 and supporting diagonals 9. These washers 14 also aid in the ease of the reel 2's rotation.

Conducting wire 1 is reeved through conducting sleeve 15 which is positioned in the center axis of an insulating bushing 16 and passes through reel carriage 10 in this manner to the interior end of the conducting sleeve 15. An exposed end of an insulated wire 17 is attached and makes contact with conducting sleeve 15. Wire 17 is then passed vertically downward to inside bottom corner of reel carriage 10 and is secured on the way by retaining clasps 18 which keep insulated wire 17 from interfering with reel 2's rotation. From here, wire passes through bottom of reel carriage 10 at hole 19 and from there to an attachment and for contact with electric current or charge source 20. This current being capable of administering a shock to livestock when they ground charge.

Reel carriage 10 is inserted in outer housing 21 and fastened thereto by sheet metal screws or bolts up through holes 22, FIGURE 2, in reel carriage 10 and corresponding holes in support shelf 23, and also fastened with screws or bolts through holes 24 in housing 21's upper restraining support 25. The lateral sides of outer housing 21 are brought in tight to the sides of the reel carriage 10 by the means of metal tabs 26 welded on the interior lateral surfaces of outer housing 21. The lateral sides of outer housing 21 are depressed when reel carriage 11 is inserted so that metal tabs 26 engage the channel shaped frame of the reel carriage 10. Further insertion of the reel carriage 10 causes the metal tabs 26 to retain outer housing 21's lateral sides firmly against sides of reel carriage 10. This operation precedes the fastening of reel carriage 10 to outer housing 21 by bolts or screws as described in the just preceding text.

Referring now to FIGURES 4, 5, 6, and 1, we see the support bracket and fastening attachment 27. The body or central part of which is channel shaped and of such a width to receive most metal fence posts of T or channel shape, and the interior medial surface of this support attachment 27 is of such width to receive the narrow edge of a 2" x 4" nominal size piece of lumber.

On the interior medial surface of the channel are slots 28 which are of such width and length and spacing to receive the most types of mid-line serrations found on many T-shaped fence posts. Nail vises 29 are shown. They are spaced at the same spacing as slots 28 and the narrow or upper end is of same width as slots 28 so as to also engage the mid-line serrations of aforementioned fence posts. Nailheads being inserted in the enlarged lower end of nail vise 29 and slipped upwards to be retained by the narrower width of the unenlarged portion.

Two pieces of chair 30 are attached in the center portion of the bracket on its outer lateral edges by bolts and nuts, welding, or retaining slots. A bolt 31 is fastened to one chain and proceeds through a small section of pipe 32 which acts as a seat for the nut 33 on bolt 31. This nut, when tightened against pipe 32, draws chain 30 together and so bracket is tightened against an object seated in its channel. This prevents the whole assembly from slipping on its support.

An eye bolt by insertion through the punched holes, which are part of many channel shaped fence posts, and then through one of the slots 28 and tightened with a nut would also help support the fastening attachment and prevent "electric livestock gate" assembly from slipping on its support, and in the case of metal fence posts with teeth bent out for wire support, the eye of the eye bolt could be slipped over a tooth and then passed through a slot 28 and then tightened by drawing up nut on eye bolt and so prevent slipping of electric gate on its support.

The support attachment 27 is secured to the outer housing 21 by a hole 34 in the upper arm of the support attachment 27 engaging a pintle peg 35 on top of outer housing 21, and on the lower arm of supporting attachment 27 is a corresponding hole 36 which engages with outer housing 21 by a bolt 37 being turned in to engage a hole 38 in support shelf 23 of reel carriage 10. Some washers 39 are shown between lower arm of support attachment 27 and support shelf 23. These washers lift the outer housing 21 up high enough so there is no rubbing of the lower arm with outer housing 21. This aids in the free movement of electric gate on its support attachment 27, and the mechanism so secured can swing freely through an arc of over 180°.

The electric gate, when secured by the means of its support attachment (for example, a fence post) at a workable height and connected to its current source 20, is supported in the following manner. The operator wishing to restrict passage of cattle from, for example, the barnyard, grasps the insulated handle 40 and pulling on it extracts the wire 1 through insulated bushing 16 and by rotation of reel 2 enough wire is reeved through insulated bushing 16 to allow the wire 1 to span the opening in barnyard. The operator thereupon hooks hook 41 (also insulated from wire 1) of handle 40 to another post or supporting object so wire, tensioned by spring 3 and restrained on other end by hook 41, is suspended at a suitable distance from ground. Cattle curious or attempting to pass through opening spanned by uninsulated wire 1 touch it and ground the current or charge thereby receiving a shock and draw back from barnyard opening as intended they should. When use of electric gate is no longer desired, operator unhooks hook 41 from its support and allows reel 2 tensioned by spring 3 to revolve in opposite direction as when wire was extended 3 and so retracts wire 1 back through insulated bushing 16 and again stores itself on reel 2 till again used.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. A portable electric livestock barrier and gate comprising, a housing, a bare flexible electric conducting wire secured at one end to an insulated reel within said housing, contact means contacting said conducting wire to supply electric current to said conducting wire, an insulated handle secured to the other extremity, means for securing said housing to a support therefor.

2. The invention of claim 1 wherein the electrical contact means is an conducting sleeve through which the bare conducting wire passes.

3. The invention of claim 1 wherein the conducting sleeve is set in an inset of insulating material in said housing and so located that the conducting wire passing from the reel to the outside of the housing is in constant with the conducting sleeve.

4. The invention of claim 1 wherein the means for securing said housing to a support are adjustable for fitting to various sizes and shapes of support.

5. A portable electric livestock barrier and gate comprising a housing, a bare flexible electric conducting wire secured at one end to an insulated reel within said housing, the conducting wire extending through a conducting sleeve in the housing, electric current means connected with the conducting sleeve, an insulated handle secured to the other end of the conducting wire and carrying a hook at its extremity and means pivotally secured to said housing for attachment to supports.

6. The invention of claim 5 wherein the pivotal means are vertically positioned.

7. The invention of claim 5 wherein the means for attachment to supports are adjustable to various sizes and shapes of supports.

8. The invention of claim 5 wherein the supporting means is comprised of, a square bracket-shaped member having the exterior surface of its center member channel shaped, a series of spaced openings in the channel shaped member of which two are enlarged at their lower ends to receive broad top fasteners which the narrowed upper portion of said opening will retain, and all openings are of such size and spacing to engage the mid-line serrations on many types of metal fence posts; an encircling member attached to said bracket which can be shortened to grip a supporting object between it and the said channel shaped member.

9. In a reel type portable electric livestock barrier and gate having a bare flexible electric conducting wire for extension from one side of an opening to the other, a reel and housing therefor comprising, a tensioning spring located within the reel, an insulated surface on the reel, a conducting sleeve through which the wire passes as means of transferring electric current to the conducting wire, means of insulating the conducting sleeve from grounding the charge, and the conducting sleeve so positioned that there is contact with the bare conducting wire at all times.

10. In a portable electric livestock barrier and gate, a housing which can be attached to a supporting object by means providing for pivoting of said housing with respect to said supporting object on a substantially vertical axis, a reel contained within said housing and insulated therefrom, an elongated electrical conductor attached at one end to said reel and windable upon said reel, a spring means within said housing to rotate said reel to wind said conductor there-on, said conductor attached at its end opposite said reel to means for attachment to support objects, a handle attached to said conductor adjacent said attachment means and insulated from said conductor, and electrical means provided to the described mechanism with means provided for placing an electric charge on said elongated conductor.

11. The invention of claim 10 wherein the spring means is contained within said reel.

12. The invention of claim 10 wherein the means provided for placing an electric charge on said elongated conductor consists of conducting sleeve through which the elongated conductor passes from the reel to the outside of the housing, and said conducting sleeve so placed that the elongated conductor is in constant contact with said conducting sleeve, and said conducting sleeve and electrical means to it being insulated from grounding electrical charges.

References Cited in the file of this patent
UNITED STATES PATENTS

| | | |
|---|---|---|
| 885,246 | Hall | Apr. 21, 1908 |
| 2,089,370 | Heinrich et al. | Aug. 10, 1937 |
| 2,114,876 | Forbes | Apr. 19, 1938 |
| 2,306,661 | Gengler | Dec. 29, 1942 |